May 21, 1946.　　　G. S. MESSINGER　　　2,400,703
DISTRIBUTOR FOR DUST APPLYING MECHANISMS
Filed June 12, 1942　　　2 Sheets-Sheet 1
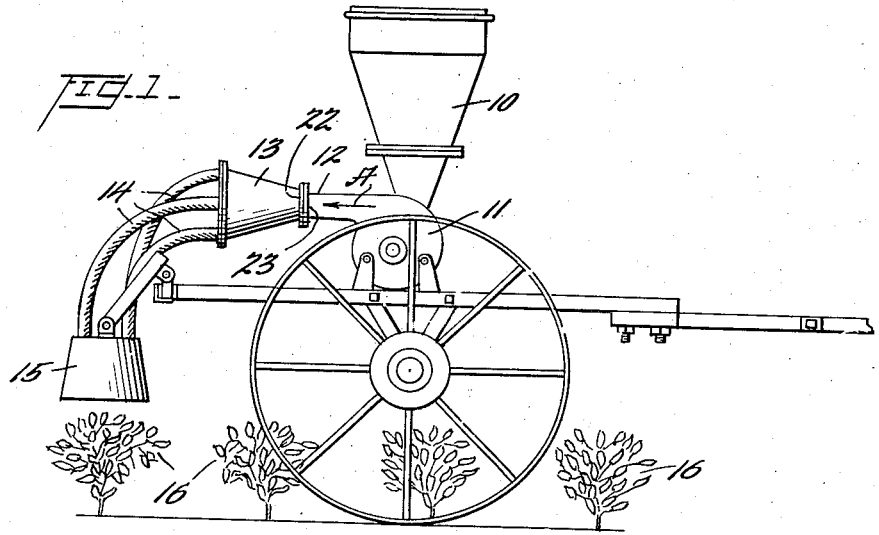
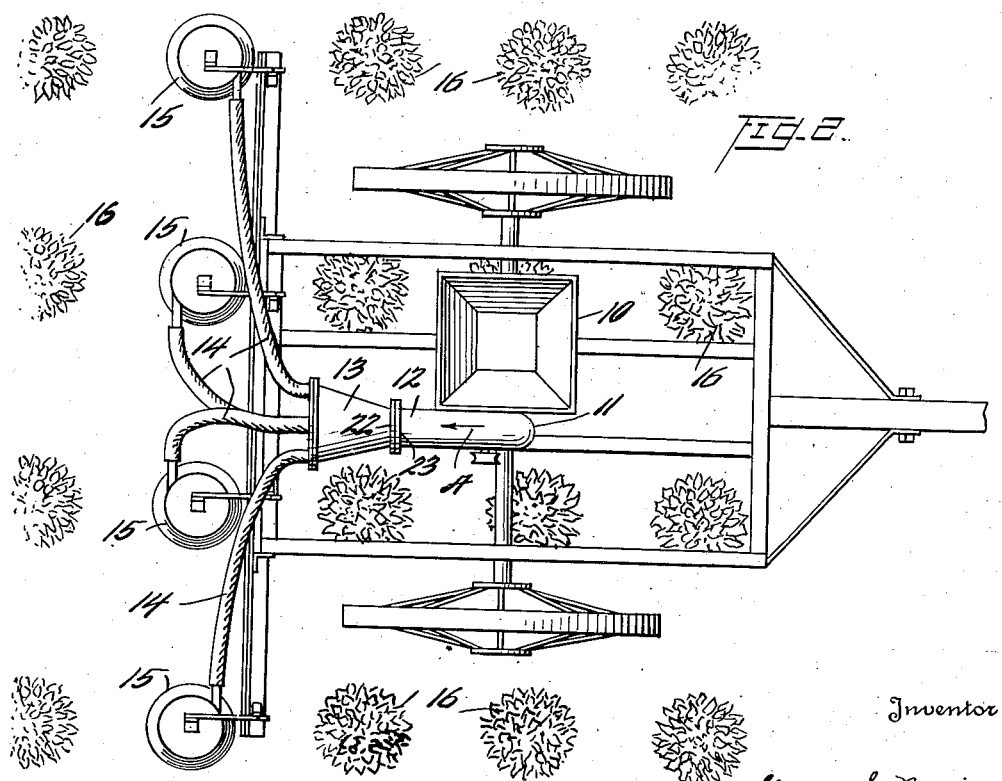
Inventor
George S. Messinger
By Watson, Cole, Grindle & Watson
Attorney

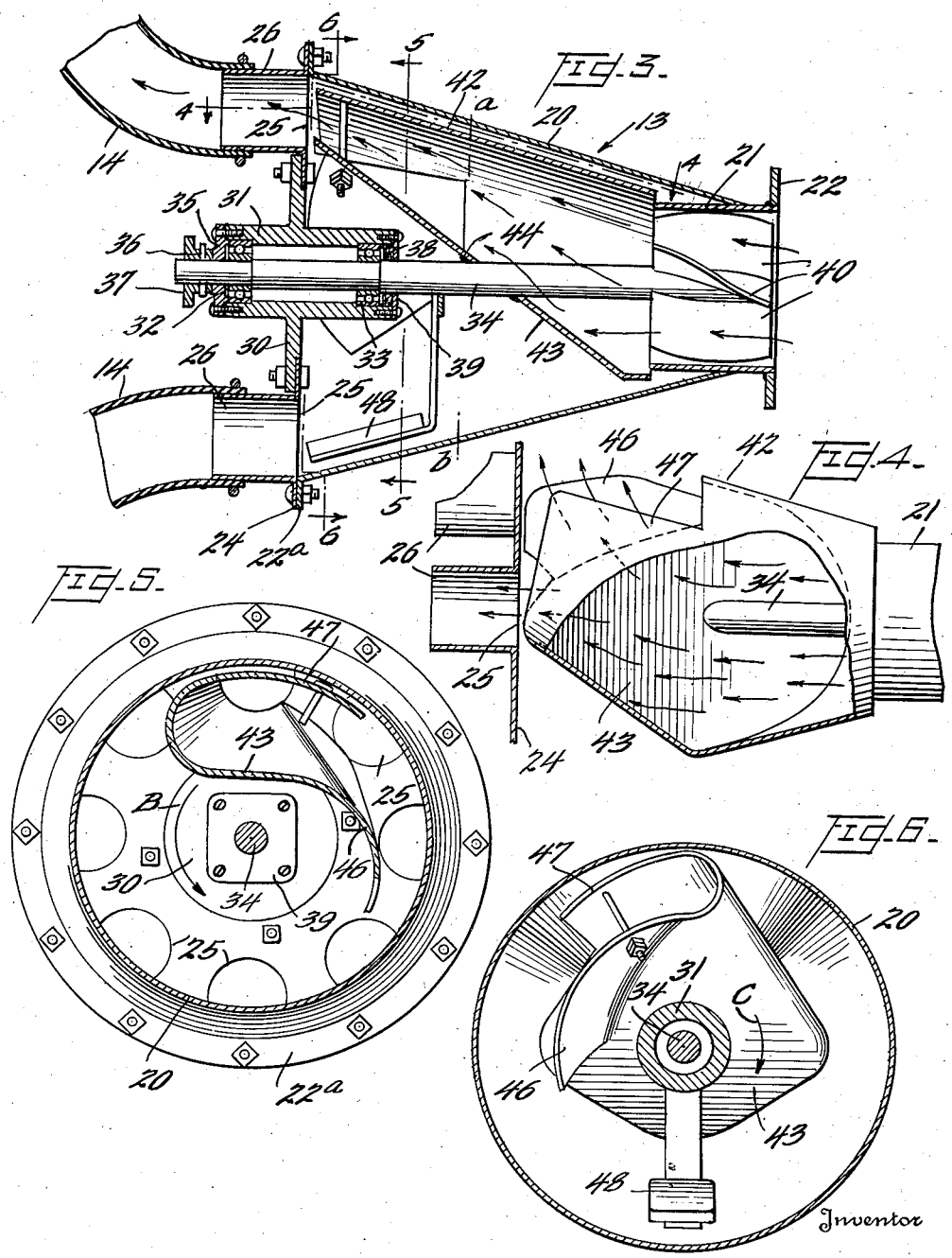

Patented May 21, 1946

2,400,703

UNITED STATES PATENT OFFICE 2,400,703

DISTRIBUTOR FOR DUST APPLYING MECHANISMS

George S. Messinger, Tatamy, Pa., assignor to Messinger Manufacturing Company, Tatamy, Pa., a corporation of Pennsylvania Application June 12, 1942, Serial No. 446,802

7 Claims. (Cl. 302—28)

For the purpose of controlling insect attack on growing plants by the application of poisons in the form of dust it is essential that all surfaces of the leaves and stems of the plants undergoing treatment be actually dust coated. Numerous types of machines or mechanisms for actually applying the dust to such leaf and stem surfaces have heretofore been designed or suggested, some of which are of substantial size and mounted upon wheeled supports and others of which are of relatively small size and intended to be borne manually. In the treatment of large numbers of plants growing in fields it is most convenient and economical to employ dusting apparatus which comprises means for the application of dust simultaneously to a number of plants and one apparatus for effectively accomplishing this operation is disclosed and illustrated in Patent No. 1,716,970, issued June 11, 1929.

In the dusting apparatus disclosed in that patent there is, mounted upon a frame suitably supported upon wheels, a means for creating a rapidly flowing stream of dust-laden air, together with a plurality of nozzle-like devices for directing a plurality of minor streams of dust-laden air toward and against the leaf and stem surfaces of a number of plants simultaneously, together with a "distributor" or means for dividing the major stream of dust-laden air originally generated into a plurality of minor streams, one for each nozzle. While it is found that the mechanism employed for originally creating the high velocity stream of dust-laden air is highly efficient in operation, difficulty has been experienced in dividing this major stream into the numerous individual minor streams which pass to the individual spray nozzles, it having been found that, notwithstanding the exercise of great care in the construction of the distributor, that certain of the smaller streams of dust-laden air contain substantially more dust than others, certain surfaces of the plants being, therefore, coated too heavily and other surfaces too lightly, and one plant of a number being simultaneously dusted being more than adequately covered and another plant less than adequately covered.

It is the purpose of the present invention to provide an improved and more efficient means for dividing a major stream of dust-laden air into a plurality of minor streams, each such minor stream transmitting approximately the same amount of dust as any of the others. Segregation of dust and its concentration in any one of the issuing minor streams is not only prevented but the mechanism is so constituted that it may receive from the original dust and air mixing machine a major stream in which the dust is by no means uniformly distributed throughout the air but will nevertheless deliver to the several distributing nozzles minor streams in which there is substantially uniform distribution of dust throughout—this despite the action of centrifugal force, the force of gravity, skin friction, and other factors which tend to promote segregation.

Essentially the improved distributor includes a casing having a relatively large port at one end through which the incoming major stream of dust-laden air may pass, a circular series of relatively smaller ports at or toward its opposite end through which the several minor streams of dust-laden air may escape and a rotor or rotatable directing member intermediate the inlet port and the series of outlet ports for acting upon the incoming stream and causing it to be directed toward each of the outlet ports in rapid succession, the directing member revolving very rapidly about a fixed axis and being so designed and constructed that, while it performs its directing or distributing functions most efficiently, it does not at any time comprise a positive block between the inlet port and any one of the several outlet ports. The details of construction of the distributor and its precise method of operation will be hereafter described but it will be understood by one skilled in the art that the form of the invention which has been selected for disclosure is set forth by way of example only and that, in adapting the invention to the handling of different types of dusting materials, and the treatment of different types of plants, its details of construction and arrangement of elements may be considerably varied without departure from the invention.

In the drawings:

Figures 1 and 2 show in side elevation and in plan, respectively, a simple type of mobile dusting apparatus which includes a dust distributor constructed in accordance with the invention;

Figure 3 is a longitudinal or axial section through the distributor;

Figure 4 shows in side elevation, partially broken away, the rotor or directing member of the distributor, as this member would be seen were it viewed from the direction indicated by the line 4—4 of Figure 3;

Figure 5 is a section on line 5—5 of Figure 3; and

Figure 6 is a section on line 6—6 of Figure 3.

The details of the mobile support for the dusting mechanism may be varied widely, any wheeled support capable of carrying the operative parts of the dusting mechanism being suitable. The means for initially creating the stream of dust-laden air which is to be distributed may likewise be varied within wide limits, but I preferably construct this apparatus substantially in the manner disclosed in my prior patent, previously referred to, the mechanism including a hopper generally indicated at 10 to receive solid material in the form of dust or small granules, which material is fed downwardly at a substantially uniform but controlled rate into a chamber containing a beater, the beater rapidly revolving and distributing the dust throughout the chamber. A current of air passes rapidly through the dust and air mixing chamber, being developed by the action of a centrifugal fan the outer casing of which is indicated at 11, the air picking up the dust generated by the beater and the column of rapidly moving air with its entrained dust passing into the fan offtake 12, moving in the direction of the arrow A, Figures 1 and 2, toward the inlet port of the distributor, which is generally indicated by the numeral 13. From the distributor a plurality of flexible offtake conduits 14 lead to the several nozzles 15 by means of which the several rapidly flowing streams of dust-laden air are directed upon the plants to be dusted, certain of these plants, arranged in rows, being indicated by the numerals 16. While the nozzles 15 by means of which the streams of dust-laden air are actually directed upon the plants to be dusted may vary widely in construction, I prefer to form these nozzles in the manner described and claimed in my pending application, Serial No. 394,184, filed May 19, 1941, having found these nozzles to be particularly effective in actual use. The number of nozzles employed is immaterial insofar as the action of the improved distributor is concerned, it being only necessary to provide one distributor outlet port for each nozzle and to provide one connecting flexible tube or hose 14 between each such distributor outlet port and the associated nozzle.

By referring more particularly to Figures 3 to 6 of the drawings the details of construction of the distributor may be more clearly perceived. It comprises a frusto-conical casing 20 within the smaller end of which is positioned and securely fastened a concentric hollow cylinder or sleeve 21, the outer end of which is provided with a peripheral flange 22 by means of which, and suitable bolts or other connecting elements, the casing may be firmly attached to a similar flange 23 on the end of the offtake duct 12 of the fan or blower 11. The opposite end of the frusto-conical casing 20 is provided with an annular flange 22a and to this flange is bolted or otherwise suitably secured an annulus 24 in which are formed a circular series of outlet ports 25, equidistantly spaced from the axis of the casing 20 and equidistantly spaced from each other. In Figure 5 of the drawings eight minor outlet ports 25 are illustrated and this distributor is intended for use with a dusting apparatus employing eight nozzles. Only four such ports 25 will be used, however, with an apparatus of the type shown in Figures 1 and 2, which includes only four distributing nozzles 15.

Coaxial with each port 25 is a sleeve 26 the inner end of which is attached to plate 24 and which sleeve comprises means for facilitating the attachment to the distributor of the inlet end of an offtake hose or conduit 14. Bolted to the inner margin of the annular plate 24 is a circular plate 30 which carries a sleeve 31, which sleeve in turn supports spaced bearings 32 and 33 both of which are coaxial with the frusto-conical portion 20 of the casing. Bearings 32 and 33 rotatably support a shaft 34 extending axially of the frusto-conical member 20, one end of shaft 34 extending through an annulus 35 secured to the outer end of sleeve 31 and having fixed thereon, as by a pin 36, a flanged sleeve 37. At the opposite end of the sleeve 31 the shaft is encircled by dust excluding means including a fibrous washer 38 and a washer-confining annulus 39. The opposite end of shaft 34 lies within the tube or sleeve 21 and is shown to be provided with a plurality of vanes 40 which, when subjected to the action of a rapidly flowing stream of dust-laden air, will be so acted upon as to spin the shaft 34 in its supporting bearings.

Also mounted on shaft 34 is a rotor or directing member 42. This member may be described as being generally tubular in form and as extending from the inner end of the tube or sleeve 21 to the immediate proximity of the annular plate 24 in which the outlet ports 25 are formed. As shown in Figures 3 and 6 a portion of this rotor or directing member, which portion is indicated at 43, is substantially flat and extends diagonally of the axis of casing 20 from a point close to plate 24 to a point adjacent the inner end of tube 21, shaft 34 extending through a suitably formed aperture in plate 43 and plate 43 being attached to shaft 34 in any suitable manner as for instance by circular weld 44.

It is a function of the deflector plate 43 to intercept the stream of incoming gas-laden air passing through tube 21 and to direct this stream laterally, as indicated by the arrows in Figure 3. That portion of the directing member 42 which lies to the right of the line $a$—$b$, Figure 3, is in the form of a closed tube, the end being truly circular with its edge offset outwardly slightly from the circular end of the tube 21, as shown in Figure 3, while that portion of the directing member 42 which lies to the left of the line $a$—$b$, or toward the larger end of the distributor, is in the form of a tube one side of which is open. Member 42, of course, rotates with shaft 34 when shaft 34 rotates and the direction of rotation of shaft and directing member is indicated by the arrow B in Figure 5 and by the arrow C in Figure 6.

By reference to these figures it will be observed that, while that end of the directing member 42 which lies closest to plate 24 may still be generally designated as tubular in form, its trailing or following side is open so that any dust-laden air which flows through this portion of member 42 toward plate 24 may not only escape through its open end but may likewise escape to the rear, flowing outwardly into the interior of casing 20 through the space between the curved guards 46 and 47. Hence it is clear that, while the directing member 42 guides the incoming stream of dust-laden air toward the ports 25 the interior of this member is in constant open communication with the remainder of the space within the distributor casing 20 so that at no time is any one of the ports 25 out of communication with the inlet port.

A counterweight is indicated at 48, being attached to the shaft 34 in such position as to counterbalance the generally tubular directing member 42 which is also attached to the shaft, in order that there shall be little or no vibration when the distributor is in operation.

In the operation of the dusting mechanism of which the novel distributor comprises an essential element, a stream of dust-laden air will be discharged through the discharge duct 12 of the fan 11 at high velocity, as previously set forth. This stream, during its passage through tube 21 into casing 20 passes the vanes 40 mounted on shaft 34 and imparts a rapid whirling motion to the shaft and to the attached directing member 42 secured thereon. The dust-laden air passing through directing member 42 will escape from the open end of this member, or through the opening in its side so as to pass into the interior of the casing through the passage between the guards 46 and 47, thus having access to all of the discharge ports 25. When the leading edge of the discharge end of the directing member 42 is disposed as shown in the drawings, particularly in Figure 4, this inclined portion of the directing member will also act as a vane, being thrust forwardly by the action of the dust-laden stream and imparting increased velocity or rotation to member 42. In any event, by the means illustrated, or by an external driving means acting upon shaft 34 without the casing, a rapid rotation is imparted to the shaft and directing member, causing the open discharge end of this member to sweep over ports 25 in rapid succession, discharging dust-laden air directly into each port as it passes over the same, any excess dust-laden air, however, being permitted to freely flow to the other ports.

That portion of the space within casing 20 which lies without the directing member 42 will, as a result, be filled with dust-laden air at all times, under positive pressure, and streams of dust-laden air will constantly flow through all of the ports 25 and all of the flexible ducts 14 to all of the nozzles 15. Naturally there will be some slight pulsation in these streams successively as the member 42 revolves since when the discharge end of this member is in register with any one port 25 there is direct passage, for an instant, of dust-laden gas directly into this port at a velocity higher than that at which the dust-laden gas is flowing into the other ports 25. This slight amount of pulsation, however, is beneficial, tending to maintain the dust in suspension. The rapid action of member 42 prevents segregation, in fact it not only prevents segregation, but it acts as a second beater, redistributing dust uniformly throughout the air stream in any case in which the dust in the incoming stream has been segregated. When an apparatus of the type described is employed as an element of a dusting implement any number of nozzles may be employed with the assurance that each nozzle is going to be supplied with dust-laden air in substantially the same manner and amount as every other nozzle.

Having thus described the invention, what is claimed as new and desired to be secured by Letters Patent is:

1. A distributor for dust-laden gases comprising a casing having a relatively large inlet port and a circular series of relatively small outlet ports, a generally tubular directing member mounted for rotation about a fixed axis, the inlet end of said member being in constant register with the inlet port and the outlet end being eccentric to said axis and disposed to register successively with said outlet ports as said member rotates in one direction, the trailing side of said member being cut away adjacent the outlet end thereof, and substantially parallel guards projecting rearwardly from said member for momentarily confining dust-laden gas escaping through the open side of said member.

2. A distributor for dust-laden gases comprising a casing having a relatively large inlet port and a circular series of relatively small outlet ports, a generally tubular directing member mounted for rotation about a fixed axis, the inlet end of said member being in constant register with the inlet port and the outlet end being eccentric to said axis and disposed to register successively with said outlet ports as said member rotates in one direction, the trailing side of said member being cut away adjacent the outlet end thereof, and curved guards springing from the lower end of said member on opposite sides of the lateral opening therein for confining momentarily over the ports of said circular series, dust-laden air escaping through the open side of said member.

3. A distributor for dust-laden gases comprising a casing having a relatively large port for an incoming stream of dust-laden gas and a plurality of relatively small outlet ports, and a rotor within said casing having a single tubular deflector rotatable about an axis, for directing the incoming stream toward said outlet ports successively, said deflector having an aperture of large size in its rear wall adjacent the outlet end thereof whereby the interior thereof is in constant communication with all discharge ports of the distributor.

4. A distributor for dust-laden gases comprising relatively rotatable housing and directing means, the housing having a relatively large inlet port and a plurality of outlet ports spaced from the inlet port, the directing means being generally tubular, having one end in constant register with the said inlet port and its other end positioned to register successively with said outlet ports, the trailing side of said directing means, adjacent the delivery end thereof, having an opening of relatively large area formed therein, thus causing the interior of the directing member to be in constant communication at all times with the several outlet ports of the casing.

5. A distributor for dust-laden gases comprising a casing having a relatively large inlet port and a circular series of relatively small outlet ports, a generally tubular directing member mounted for rotation about a fixed axis, the inlet end of said member being in constant register with the inlet port and the outlet end being eccentric to said axis and disposed to register successively with said outlet ports as said member rotates in one direction, the trailing side of said member adjacent the outlet end thereof having an aperture formed therein so as to maintain communication at all times between the interior of the directing member and all of the outlet ports of the casing.

6. The combination set forth in claim 5 in which the leading side of said member is so formed and disposed that a current of dust-laden gas passing therethrough will impart a forward motion of rotation to said member.

7. The combination set forth in claim 5 in which vanes rigidly connected to said member are positioned to be acted on by the incoming gaseous stream, whereby rotary motion is imparted to said member.

GEORGE S. MESSINGER.